United States Patent [19]

Georgiev et al.

[11] 4,101,186
[45] Jul. 18, 1978

[54] CONTACT CLAMP FOR GRAPHITE ELECTRODES

[75] Inventors: Georgi Metev Georgiev; Peter Lazarov Shivachev; Todor Yankov Koychev; Lyuben Kostov Lazov; Alexander Yordanov Valchev, all of Sofia, Bulgaria

[73] Assignee: DSO "Cherna Metalurgia", Sofia, Bulgaria

[21] Appl. No.: 773,754

[22] Filed: Mar. 2, 1977

[30] Foreign Application Priority Data

Mar. 3, 1976 [BG] Bulgaria ................................. 32515

[51] Int. Cl.² ............................................. H01R 39/00
[52] U.S. Cl. ................................... 339/5 S; 310/232; 403/334; 339/2 R
[58] Field of Search ............ 339/5 M, 5 P, 5 S, 5 R, 339/2 R; 403/333, 334, 292; 310/237, 232

[56] References Cited

U.S. PATENT DOCUMENTS

| | | | |
|---|---|---|---|
| 2,908,803 | 10/1959 | Williams et al. | 339/5 S X |
| 3,396,586 | 8/1968 | Maclin et al. | 339/5 R X |
| 3,441,765 | 4/1969 | Maybury et al. | 339/5 S X |
| 3,842,301 | 10/1974 | Smith | 339/5 R X |

Primary Examiner—Roy Lake
Assistant Examiner—DeWalden W. Jones
Attorney, Agent, or Firm—Karl F. Ross

[57] ABSTRACT

A contact clamp for graphite electrodes, which comprises a shaft, the one end of which is shaped as a cone, while the other ends with a neck, onto which there is seated a metal hub shaped as a truncated cone, and to the shaft there is fastened a current-carrying disk, which is in contact with current-supplying brushes.

4 Claims, 4 Drawing Figures

CONTACT CLAMP FOR GRAPHITE ELECTRODES

FIELD OF THE INVENTION

This invention relates to a contact clamp for graphite electrodes which is used during the process of applying a protective coating onto the electrodes.

BACKGROUND OF THE INVENTION

An arrangement for this purpose is known in which in the nipple seat of the graphite electrode there are screwed-on journals, which represent a semi-nipple with a central hole bored in it. The journal is slipped over a metal rod, in both ends of which there are welded strips with seats for set bolts. In the one end of the metal rod there is shaped a seat for a center.

The drawbacks of this arrangement are: it is an expensive device of heavy weight, which requires frequent replacement and maintenance of the worn-out elements; the attachment of the equipment to the electrodes requires heavy physical labor. Moreover, it cannot provide a precise coaxial alignment between the journal and the electrode; this results in an excentricity which impairs the quality of the coating. The current passing through the journal encounters many transition resistances which produce varying drops of the voltage.

OBJECT OF THE INVENTION

It is, therefore, a general object of the present invention to avoid the aforementioned drawbacks by providing a contact clamp for graphite electrodes, which is used during the process of applying a protective coating thereon, this clamp being easy to maintain and to install and providing a current supply over the shortest path with the least possible transient resistances.

SUMMARY OF THE INVENTION

This object is achieved by means of a contact clamp for graphite electrodes comprising a shaft, the one end of which is shaped as a cone, while the other ends with a neck over which a metal hub, shaped as a truncated cone, is slipped. Fastened to the shaft is a current carrying disk, which is in contact with current-supplying brushes. The current carrying disk is connected to the shaft by means of lugs, seated in apertures formed in its base, the lugs being pressed in a flange formed on the shaft, while the current-carrying disk touches the face of the graphite electrode. Over the metal hub there is slipped a conical sleeve.

BRIEF DESCRIPTION OF THE DRAWING

For a better understanding of the invention, reference is made to the accompanying drawings, in which.

SPECIFIC DESCRIPTION

Figure 1:
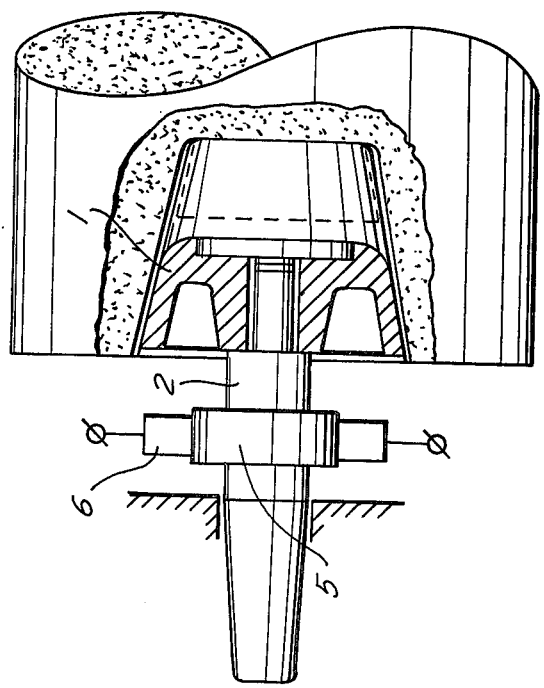
FIG. 1 is a sectional view through a nipple seat and the contact clamp, in which the current-carrying disk is press fitted on the shaft.
Figure 4:
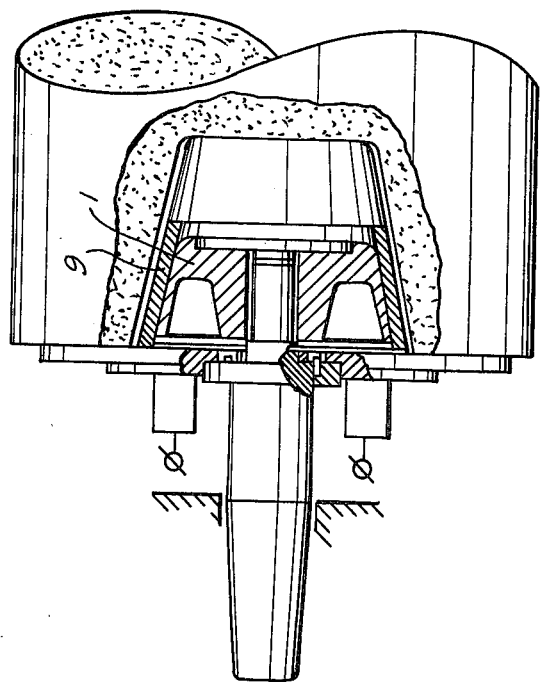
FIG. 4 is a sectional view of another embodiment in which a conical sleeve is slipped over the metal hub.
Figure 3:
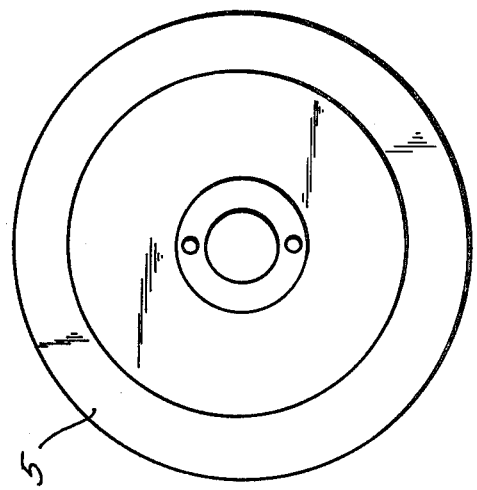
FIG. 3 is a plan view of a current-carrying disk.
Figure 2:
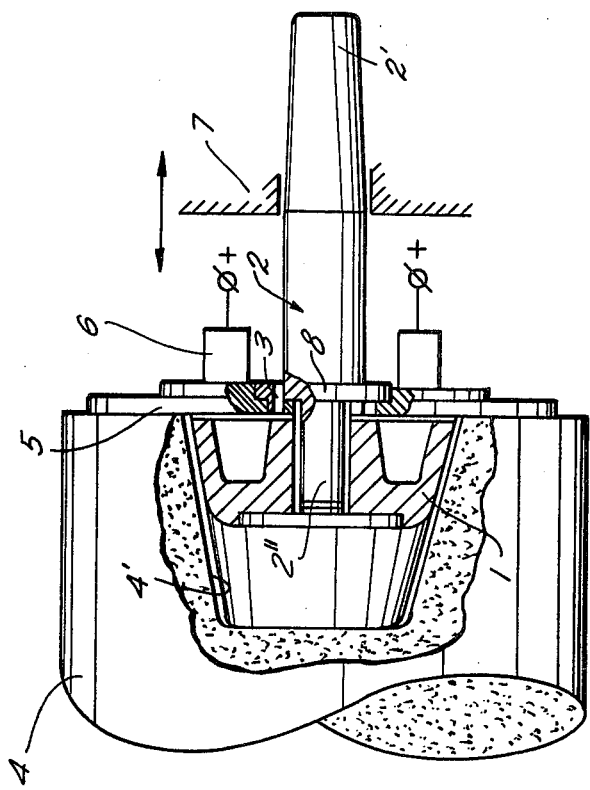
FIG. 2 is a sectional view of another embodiment in which the current-carrying disk is attached to the shaft by means of lugs.

In the centering seat 7 of the body of the coating machine there is disposed the cone-shaped end 2' of shaft 2, the other end of which is formed with a neck 2'', over which there is slipped a metal hub 1, disposed in the nipple seat 4' of the graphite electrode 4. Fastened to shaft 2 is the current-carrying disk 5, which is in contact with current-supplying brushes 6.

In another embodiment the current-carrying disk 5 is connected to shaft 2 by means of lugs 3, which are pressed in flange 8 formed on shaft 2. The current-carrying disk 5 touches the face of the graphite electrode 4. A conical sleeve 9 is slipped over the metal hub 1.

The operation of the contact clamp is as follows: after transfering the graphite electrode 4 to the coating machine, the metal hub 1 comes into the nipple seat and centers the electrode 4 until the current-carrying disk 5 is pressed against the face of electrode 4. The current supply is effected by means of current-supplying brushes 6 through the current-carrying disk 5 towards the rotating electrode.

What we claim is:

1. A contact clamp for a graphite electrode comprising:
   a shaft formed adjacent one end with a conical portion, and adjacent the other end with a neck portion;
   a metal hub formed as a truncated cone and seated on said neck portion, said hub being receivable in a conical seat formed in said electrode;
   a current-carrying disk on said shaft and in electrical connection with said electrode; and
   current-supplying brushes in contact with said disk.

2. The clamp as defined in claim 1 wherein said hub is provided with a conical sleeve interposed between said hub and said electrode.

3. The clamp as defined in claim 1 wherein said disk is press fitted on said shaft in a spaced apart relationship with said electrode.

4. The clamp as defined in claim 1 further comprising:
   a flange formed on said shaft;
   apertures formed in said disk; and
   lugs on said flange engaging said apertures, said disk being in physical and electrical contact with said electrode.

* * * * *